United States Patent
Miyamoto et al.

(10) Patent No.: US 12,495,200 B2
(45) Date of Patent: Dec. 9, 2025

(54) CONTROL APPARATUS, FLASHLIGHT APPARATUS, IMAGE PICKUP APPARATUS, CONTROL METHOD, AND STORAGE MEDIUM

(71) Applicant: CANON KABUSHIKI KAISHA, Tokyo (JP)

(72) Inventors: Souhei Miyamoto, Kanagawa (JP); Yoshiro Ichihara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/494,959

(22) Filed: Oct. 26, 2023

(65) Prior Publication Data

US 2024/0147045 A1    May 2, 2024

(30) Foreign Application Priority Data

Oct. 27, 2022  (JP) ................................. 2022-172774

(51) Int. Cl.
*H04N 23/56*     (2023.01)

(52) U.S. Cl.
CPC ................................. *H04N 23/56* (2023.01)

(58) Field of Classification Search
CPC ......... H04N 23/56; G03B 15/00; G03B 15/03
See application file for complete search history.

(56) References Cited

U.S. PATENT DOCUMENTS

2014/0085503 A1\*   3/2014   Su ..................... H04N 23/71
                                                           348/E5.026

FOREIGN PATENT DOCUMENTS

| CN | 113739087 A | * 12/2021 | ............... F21K 9/64 |
| JP | 2012-032618 A | 2/2012 | |
| JP | 6935272 B2 | 9/2021 | |
| WO | WO-2012011355 A1 | * 1/2012 | ............. H04N 23/74 |

\* cited by examiner

*Primary Examiner* — Minh Q Phan
(74) *Attorney, Agent, or Firm* — Cowan, Liebowitz & Latman, P.C.

(57) ABSTRACT

A control apparatus is configured to control light emissions of a first light emitting unit and a second light emitting unit for each one or more flashlight apparatuses each of which includes the first light emitting unit and the second light emitting unit capable of emitting light for a longer time than the first light emitting unit. The control apparatus includes acquires information about a setting for causing the first light emitting unit to emit light, and simultaneously control light emissions of the second light emitting units using the information.

10 Claims, 4 Drawing Sheets

PRIOR ART

FLASHLIGHT
APPARATUS A

1. LIGHT EMITTING INSTRUCTION

2. LIGHT EMISSION STOP INSTRUCTION

3. LIGHT EMISSION STOP INSTRUCTION

FLASHLIGHT
APPARATUS B

FLASHLIGHT
APPARATUS C

FLASHLIGHT
APPARATUS D

CONTROL APPARATUS, FLASHLIGHT APPARATUS, IMAGE PICKUP APPARATUS, CONTROL METHOD, AND STORAGE MEDIUM

BACKGROUND

Technical Field

One of the aspects of the embodiments relates to a control apparatus, a flashlight apparatus, an image pickup apparatus, a control method, and a storage medium.

Description of Related Art

One conventional modeling light emitting method allows simultaneous light emission from a plurality of flashlight apparatus arranged at a distance from an image pickup apparatus and allows the shade on an object to be confirmed in a short period (Japanese Patent Laid-Open No. 2012-32618).

Another conventional modeling light emitting method enables the shade on the object to be continuously confirmed using an LED light source in addition to a main light emitting unit.

The configuration disclosed in Japanese Patent Laid-Open No. 2012-32618 stops emitting light in a short period and thus may issue a light emitting instruction. In using an LED light source that can continuously emit light, it is necessary to issue both a light emitting instruction and a light emission stop instruction. For example, as illustrated in FIG. 4, in a case where a flashlight apparatus A controls light emissions of LED light sources of the plurality of flashlight apparatuses B, C, and D, the flashlight apparatus A needs to issue a light emitting instruction and a light emission stop instruction for each of the plurality of flashlight apparatuses B, C, and D. In FIG. 4, in order to model shade intended by the photographer, the flashlight apparatus A first instructs the flashlight apparatus B to emit light, and then instructs the flashlight apparatus C and D to stop emitting light in this order. In a case where the light emitting instruction and the light emission stop instruction are separately issued, unlike the setting of the light emission by the discharge tube, modeling may be different from the shade on the object intended by the user.

SUMMARY

A control apparatus according to one aspect of the embodiment is configured to control light emissions of a first light emitting unit and a second light emitting unit for each one or more flashlight apparatuses each of which includes the first light emitting unit and the second light emitting unit capable of emitting light for a longer time than the first light emitting unit. The control apparatus includes a memory that stores instructions, and a processor that executes the instructions to acquire information about a setting for causing the first light emitting unit to emit light, and simultaneously control light emissions of the second light emitting units using the information. A control method corresponding to the above control apparatus also constitutes another aspect of the embodiment. A storage medium storing a program that causes a computer to execute the above control method also constitutes another aspect of the embodiment.

Further features of the disclosure will become apparent from the following description of embodiments with reference to the attached drawings.

DESCRIPTION OF THE EMBODIMENTS

Figure 1:
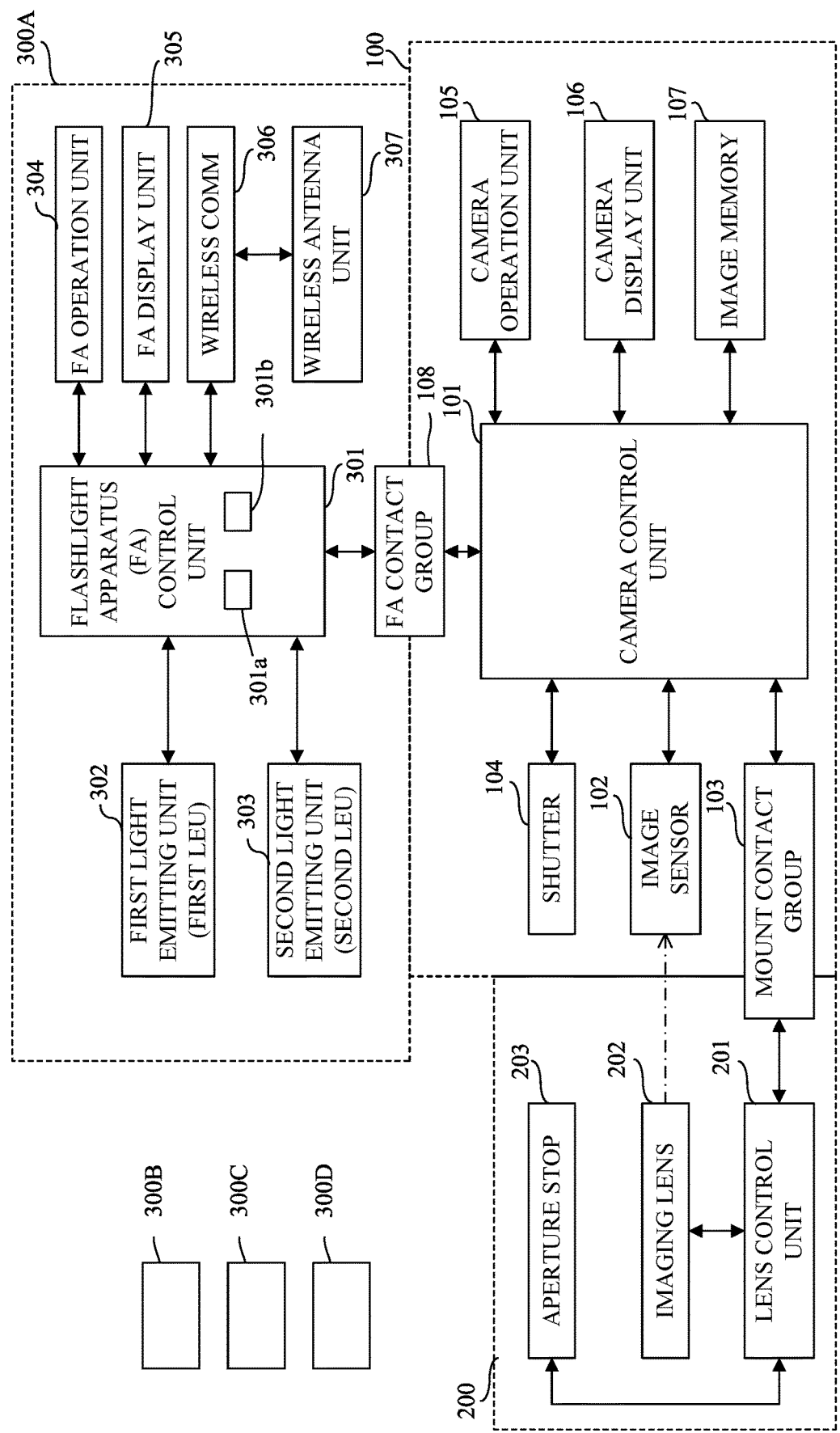
FIG. 1 is a configuration diagram of an imaging system according to this embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 is a configuration diagram of an imaging system according to this embodiment. The imaging system includes an image pickup apparatus 100, a lens 200, and a plurality of flashlight apparatuses. The image pickup apparatus 100 and the lens 200 are mechanically and electrically connected via a mount contact group 103. The lens 200 is attachable to and detachable from the image pickup apparatus 100 in this embodiment but may be integrated with the image pickup apparatus 100. A plurality of flashlight apparatuses can be mounted on a top surface of the image pickup apparatus 100, and include a sender flashlight apparatus 300A that is electrically connected to the image pickup apparatus 100 via a flashlight apparatus contact group 108, and receiver flashlight apparatuses 300B, 300C, and 300D that are not connected to the image pickup apparatus 100. The sender flashlight apparatus 300A can wirelessly communicate with the receiver flashlight apparatuses 300B, 300C, and 300D, and controls light emission of a light emitting unit provided in each receiver flashlight apparatus. The receiver flashlight apparatuses 300B, 300C, and 300D receive the light emission instruction (command) from the sender flashlight apparatus 300A and cause their light emitting units to emit light. Although the number of receiver flashlight apparatus is three in this embodiment, it may be one, or may be any number other than three.

The image pickup apparatus 100 includes an image pickup apparatus control unit (camera control unit) 101, an image sensor 102, the mount contact group 103, a shutter 104, an image pickup apparatus operation unit (camera operation unit) 105, an image pickup apparatus display unit (camera display unit) 106, an image memory 107, and the flashlight apparatus contact group 108. The image pickup apparatus control unit 101 is a microcomputer that controls the operation of each unit of the image pickup apparatus 100. The image sensor 102 is a photoelectric conversion element such as CMOS, including an infrared cut filter, a low-pass filter, and the like. The shutter 104 is disposed between the image sensor 102 and the imaging lens 202, and is closed to shield light to the image sensor 102 during non-imaging according to an instruction from the image pickup apparatus control unit 101, and is opened to guide incident light to the image sensor 102 through the lens 200 during live-viewing or imaging. The image pickup apparatus operation unit 105 detects a user operation on operation members such as a button, a switch, a dial, or a connection device attached to the image pickup apparatus 100, and sends a signal according to a detection result to the image pickup apparatus control unit 101. The image pickup apparatus operation unit 105 transmits a SW1 signal to the image pickup apparatus control unit 101 in a case where the user half-presses a release button, and transmits a SW2 signal to the image pickup apparatus control unit 101 in a case where the user fully presses the release button. An image pickup apparatus display unit 106 displays imaging information and a captured image according to an instruction from the image pickup apparatus control unit 101.

The image pickup apparatus control unit 101 controls the operation of the image pickup apparatus 100 based on the signal from the image pickup apparatus operation unit 105. In a case where the image pickup apparatus control unit 101 receives the SW1 signal from the image pickup apparatus operation unit 105, the image pickup apparatus control unit 101 drives the image sensor 102 to perform imaging and repeats photometry control for measuring the luminance of an object from the imaging result. Thereafter, the image pickup apparatus control unit 101 determines a shutter speed, F-number (aperture value), and ISO speed to be used during imaging from the photometry result. Here, the shutter speed, F-number, and ISO speed that are used during imaging will be collectively referred to as an exposure control value. The image pickup apparatus display unit 106 displays the determined exposure control value. When receiving the SW2 signal from the image pickup apparatus operation unit 105, the image pickup apparatus control unit 101 drives the aperture stop in the imaging lens 202 and sets the sensitivity (ISO speed) of the image sensor 102. Thereafter, the image pickup apparatus control unit 101 controls the shutter 104 to irradiate the image sensor 102 with light. The image pickup apparatus control unit 101 causes the image pickup apparatus display unit 106 to display a captured image according to the image data acquired from the image sensor 102 and controls the writing of image data in the image memory 107.

The lens 200 has a lens control unit 201, the imaging lens 202, and an aperture stop 203. The lens control unit 201 is a microcomputer that controls the operation of each part of the lens 200, and adjusts a light amount and performs focusing taken into the imaging system according to an instruction from the image pickup apparatus control unit 101 obtained via the mount contact group 103. The imaging lens 202 includes a plurality of lenses including a focus lens (not illustrated) for focusing, and forms an object image on the image sensor 102. The aperture stop 203 is disposed in the imaging lens 202 and adjusts the light amount.

The sender flashlight apparatus 300A includes a flashlight apparatus control unit 301, a first light emitting unit (third light emitting unit) 302, a second light emitting unit (fourth light emitting unit) 303, a flashlight apparatus operation unit 304, and a flashlight apparatus display unit 305, a wireless communication unit 306, and a wireless antenna unit 307. The flashlight apparatus control unit 301 is a microcomputer that controls the operation of each unit of the sender flashlight apparatus 300A. The flashlight apparatus control unit 301 can communicate with the image pickup apparatus control unit 101 via the flashlight apparatus contact group 108, receive a light emission control instruction and image pickup apparatus information from the image pickup apparatus control unit 101, and transmit flashlight apparatus information to the image pickup apparatus control unit 101. The first light emitting unit 302 includes a discharge tube, a light emitting capacitor, a light emitting circuit, and a light emitting optical system, and can emit flashlight. The second light emitting unit 303 includes an LED and can emit light more continuously (can emit light for a longer time) than the first light emitting unit 302. The second light emitting unit 303 emits light or stops emitting light according to an instruction from the flashlight apparatus control unit 301, and is used as a light source for modeling, an auxiliary light source for autofocusing, and a moving image light. The second light emitting unit 303 includes the LED in this embodiment but may include another light source as long as it can emit light continuously. The flashlight apparatus operation unit 304 detects the user's operation of an operation member such as a button, dial, or switch attached to the sender flashlight apparatus 300A, and transmits a signal according to the detection result to the flashlight apparatus control unit 301. The flashlight apparatus display unit 305 displays a light emission setting, radio wave setting, operation state of the sender flashlight apparatus 300A, and the like according to an instruction from the flashlight apparatus control unit 301. The wireless communication unit 306 transmits and receives wireless communication information to and from the receiver flashlight apparatus wirelessly connected via the wireless antenna unit 307. The flashlight apparatus control unit 301 transmits and receives control information such as information on light emission control of the first light emitting unit 302 and the second light emitting unit 303 to and from the receiver flashlight apparatus wirelessly connected to the wireless communication unit 306 via the wireless antenna unit 307.

The configuration of each receiver flashlight apparatus is the same as that of the sender flashlight apparatus 300A, and a description thereof will be omitted. In each receiver flashlight apparatus, the flashlight apparatus control unit controls a first light emitting unit and a second light emitting unit according to an instruction from the sender flashlight apparatus A300 via the wireless communication unit.

The flashlight apparatus control unit 301 includes an acquiring unit 301a and a control unit 301b. The acquiring unit 301a acquires information indicating whether or not the first light emitting unit is to emit light for each of the plurality of receiver flashlight apparatus. The control unit 301b simultaneously controls the light emissions of the second light emitting units of the plurality of receiver flashlight apparatus using the information acquired by the acquiring unit 301a. Here, "simultaneously" means "with single control (operation) of the control unit 301b." The second light emitting units do not need to emit light at exactly the same time and may be emitted at substantially the same time. More specifically, in a case where the setting for emitting light from the first light emitting unit of the receiver flashlight apparatus is valid, in order to cause the second light emitting unit of the receiver flashlight apparatus to emit light, the control unit 301b sends an instruction to the receiver flashlight apparatus, which causes the second emitting unit to emit light. In a case where the setting for emitting light from the first light emitting unit of the receiver flashlight apparatus is invalid, in order to prohibit the second light emitting unit of the receiver flashlight apparatus from emitting light, the control unit 301b sends an instruction to the receiver flashlight apparatus, which causes the second emitting unit not to emit light.

In this embodiment, the sender flashlight apparatus 300A includes the first light emitting unit 302 and the second light emitting unit 303, but may not include the first light emitting unit 302 or the second light emitting unit 303. That is, the sender flashlight apparatus 300A may not include the first light emitting unit 302 or the second light emitting unit 303, and may be configured as a control apparatus for controlling the light emissions of the first light emitting units and the second light emitting units of the receiver flashlight apparatuses 300B, 300C, and 300D. The image pickup apparatus 100 may have the function of the sender flashlight apparatus 300A.

Figure 2:
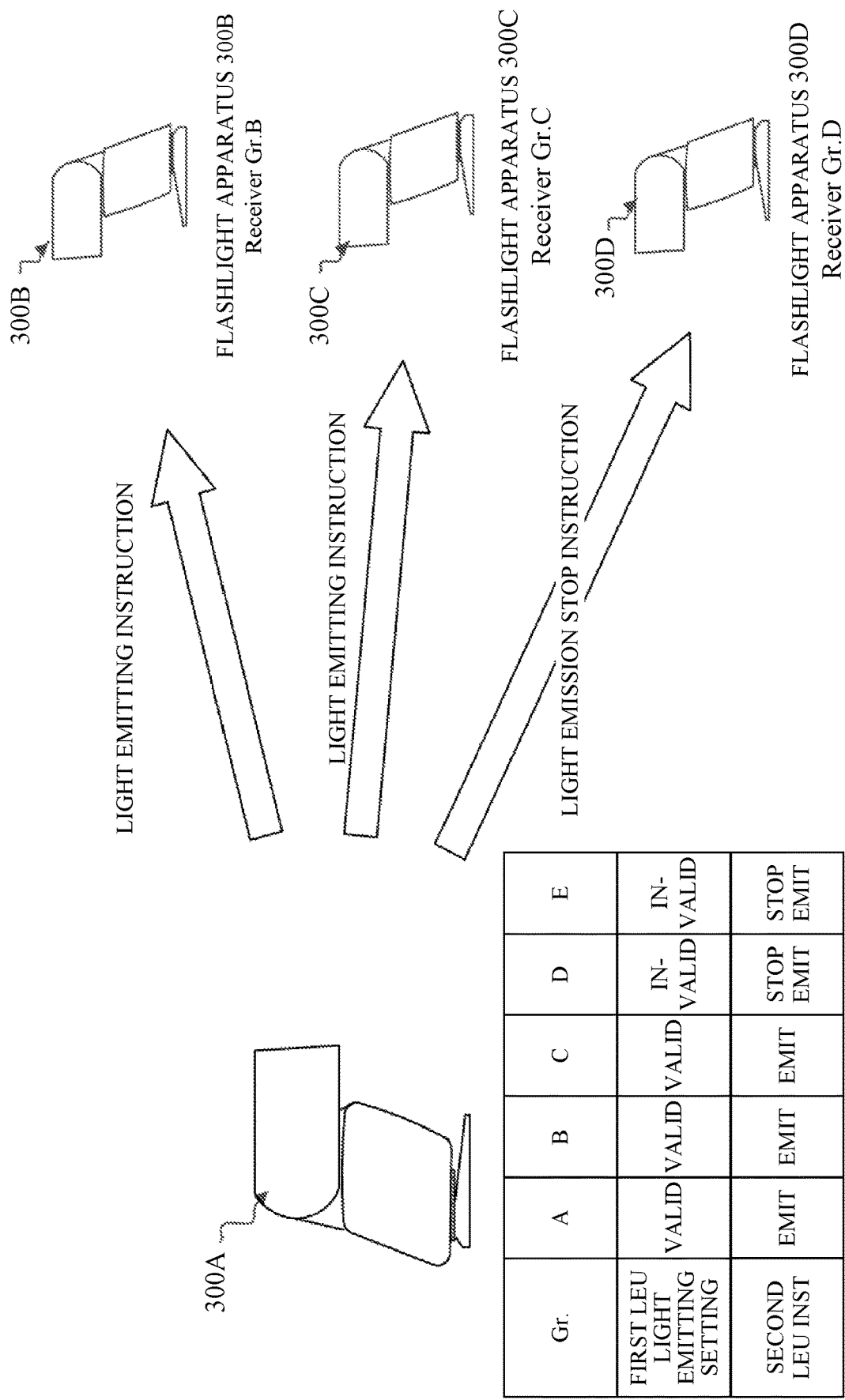
FIG. 2 illustrates an example of light emission control of a flashlight apparatus included in the imaging system.

FIG. 2 illustrates an example of light emission control of the plurality of flashlight apparatus included in the imaging system according to this embodiment. The sender flashlight apparatus 300A and the receiver flashlight apparatuses 300B, 300C, and 300D form a PAN (Personal Area Network) using their wireless communication units, and can exchange information with each other. The sender flashlight apparatus 300A is configured to be able to select a light emitting mode via the flashlight apparatus operation unit 304. In this embodiment, the light emitting mode is set to a Gr. mode in which light emissions of a plurality of flashlight apparatuses included in the same Gr. can be similarly controlled. For example, each Gr. can be set to a light emission enabled mode or a light emission disabled mode. The sender flashlight apparatus 300A may be configured so that its light emitting mode can be selected separately from the light emitting mode of Gr. In this embodiment, Gr. including the receiver flashlight apparatuses 300B, 300C, and 300D is labeled as Gr. B, Gr. C, and Gr. D. The sender flashlight apparatus 300A sets Gr. A to Gr. C to the light emission enabled mode and Gr. D and Gr. E to the light emission disabled mode. In this embodiment, the Gr. information during sender setting is fixed to Gr. A, but may be dynamically changeable to another Gr.

Figure 3:
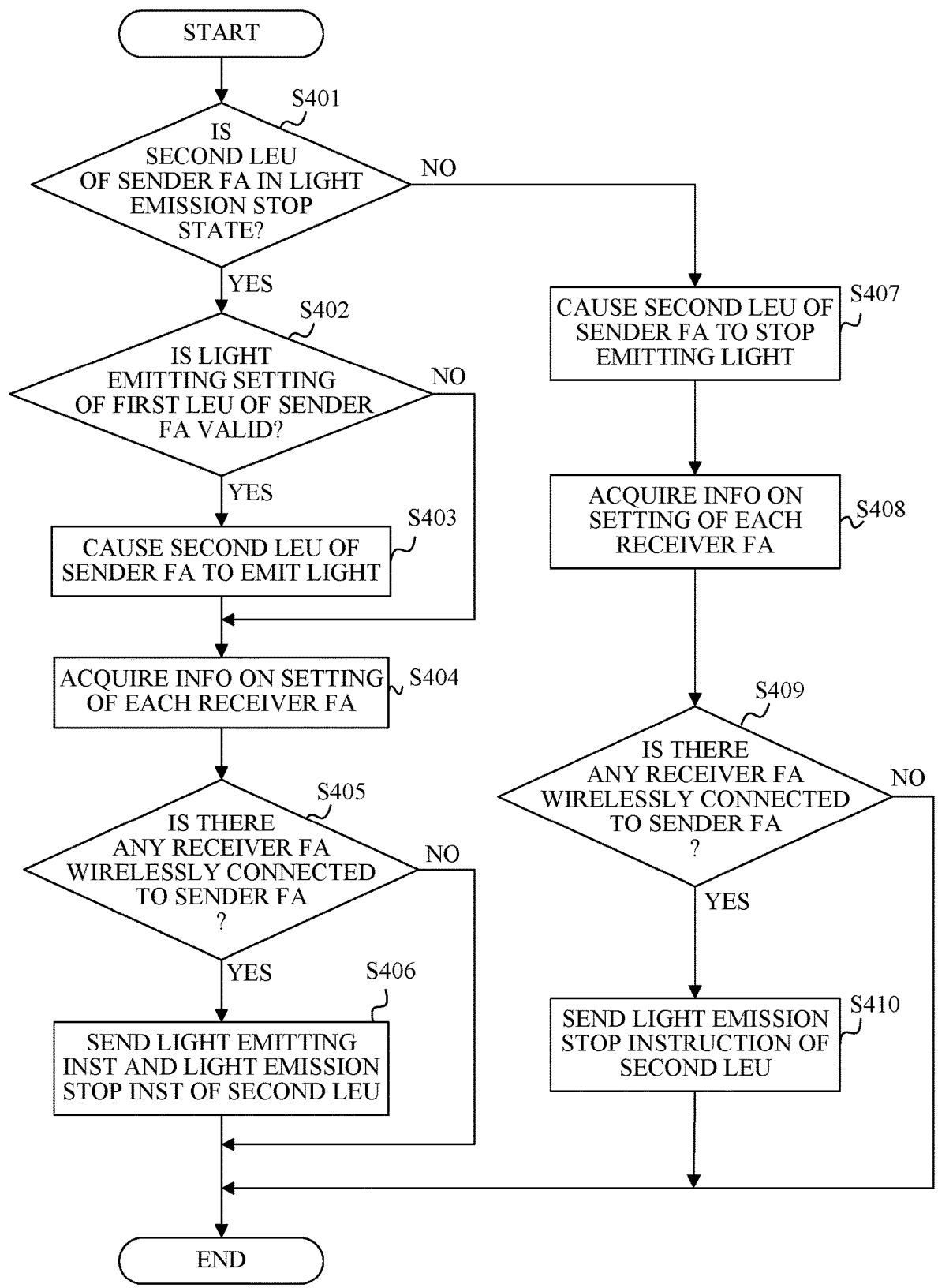
FIG. 3 is a flowchart illustrating light emission control.
Figure 4:
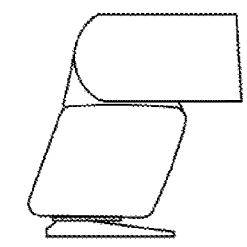
FIG. 4 illustrates a prior art example of transmitting a light emitting instruction and a light emission stop instruction to each flashlight apparatus.
Figure 4:
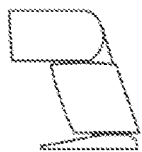
Figure 4:
Figure 4:
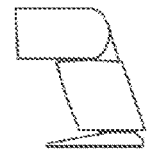

FIG. 3 is a flowchart illustrating light emission control of the second light emitting units 303 of the plurality of receiver flashlight apparatuses by the flashlight apparatus control unit 301 of the sender flashlight apparatus 300A. This flow is started according to an operation on the flashlight apparatus operation unit 304 of the sender flashlight apparatus 300A. Alternatively, it may be started according to communication from the image pickup apparatus control unit 101 to the flashlight apparatus control unit 301 via the flashlight apparatus contact group 108 in accordance with the operation of the image pickup apparatus operation unit 105. In a case where the second light emitting unit is used as autofocus (AF) auxiliary light or moving image light, it may emit light without using the flow of FIG. 3.

In step S401, the flashlight apparatus control unit 301 of the sender flashlight apparatus 300A determines whether or not the light emitting state of the second light emitting unit 303 of the sender flashlight apparatus 300A is in a light emission stop state. In a case where the flashlight apparatus control unit 301 of the sender flashlight apparatus 300A determines that the light emitting state of the second light emitting unit 303 is in the light emission stop state, the processing of step S402 is executed. In a case where the flashlight apparatus control unit 301 of the sender flashlight apparatus 300A determines that the light emitting state of the second light emitting unit 303 is not the light emission stop state, the processing of step S407 is executed.

In step S402, the flashlight apparatus control unit 301 of the sender flashlight apparatus 300A determines whether the setting for causing the first light emitting unit 302 of the sender flashlight apparatus 300A to emit light (light emitting setting of the first light emitting unit 302) is valid. In a case where the flashlight apparatus control unit 301 of the sender flashlight apparatus 300A determines that the light emitting setting of the first light emitting unit 302 of the sender flashlight apparatus 300A is valid, the processing of step S403 is executed. In a case where the flashlight apparatus control unit 301 of the sender flashlight apparatus 300A determines that the light emitting setting of the first light emitting unit 302 of the sender flashlight apparatus 300A is not valid, the processing of step S404 is executed.

In step S403, the flashlight apparatus control unit 301 of the sender flashlight apparatus 300A causes the second light emitting unit 303 of the sender flashlight apparatus 300A to emit light.

In step S404, the flashlight apparatus control unit 301 of the sender flashlight apparatus 300A acquires information on the setting of each receiver flashlight apparatus. The information on the setting of each receiver flashlight apparatus includes enabling and disabling the flashlight emission setting of each Gr.

In step S405, the flashlight apparatus control unit 301 of the sender flashlight apparatus 300A determines whether there is a receiver flashlight apparatus wirelessly connected to the sender flashlight apparatus 300A. In a case where the flashlight apparatus control unit 301 of the sender flashlight apparatus 300A determines that there is a receiver flashlight apparatus wirelessly connected to the sender flashlight apparatus 300A, the processing of step S406 is executed. In a case where the flashlight apparatus control unit 301 of the sender flashlight apparatus 300A determines that there is no receiver flashlight apparatus wirelessly connected to the sender flashlight apparatus 300A, this flow ends.

In step S406, the flashlight apparatus control unit 301 of the sender flashlight apparatus 300A sends the light emitting instruction or light emission stop instruction of the second light emitting unit to each Gr. via the wireless communication unit 306 according to enabling and disabling of the flashlight emission setting of each Gr. included in the information acquired in step S404.

In step S407, the flashlight apparatus control unit 301 of the sender flashlight apparatus 300A causes the second light emitting unit 303 of the sender flashlight apparatus 300A to stop emitting light.

In step S408, the flashlight apparatus control unit 301 of the sender flashlight apparatus 300A acquires information on the settings of each receiver flashlight apparatus.

In step S409, the flashlight apparatus control unit 301 of the sender flashlight apparatus 300A determines whether there is a receiver flashlight apparatus wirelessly connected to the sender flashlight apparatus 300A. In a case where the flashlight apparatus control unit 301 of the sender flashlight apparatus 300A determines that there is a receiver flashlight apparatus wirelessly connected to the sender flashlight apparatus 300A, the process of step S410 is executed. In a case where the flashlight apparatus control unit 301 of the sender flashlight apparatus 300A determines that there is no receiver flashlight apparatus wirelessly connected to the sender flashlight apparatus 300A, this flow ends.

In step S410, the flashlight apparatus control unit 301 of the sender flashlight apparatus 300A transmits a light emission stop instruction of the second light emitting unit to each Gr. via the wireless communication unit 306.

Due to this configuration, the sender flashlight apparatus 300A can control the light emissions of the second light emitting units 303 (transmit light emitting instructions and light emission stop instructions) to the receiver flashlight apparatuses 300B, 300C, and 300D at once.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment provides a control apparatus that allows a user to confirm the shade on an object intended by the user.

This application claims the benefit of Japanese Patent Application No. 2022-172774, filed on Oct. 27, 2022, which is hereby incorporated by reference herein in its entirety.

What is claimed is:

1. A control apparatus configured to control light emissions of a first light emitting unit and a second light emitting unit for each one or more flashlight apparatuses each of which includes the first light emitting unit and the second light emitting unit capable of emitting light for a longer time than the first light emitting unit, the control apparatus comprising:
    a memory that stores instructions; and
    a processor that executes the instructions to:
    acquire information about a setting for causing the first light emitting unit to emit light;
    simultaneously control light emissions of the second light emitting units using the information;
    wirelessly communicate with the one or more flashlight apparatuses;
    transmit an instruction to a corresponding flashlight apparatus to cause the second light emitting unit to emit light in a case where the setting is valid; and
    transmit an instruction to the corresponding flashlight apparatus to cause the second light emitting unit not to emit the light in a case where the setting is invalid.

2. The control apparatus according to claim 1, wherein the control apparatus is attached to an image pickup apparatus, and
    wherein the processor is configured to control light emission of the second light emitting unit according to an instruction from the image pickup apparatus.

3. The control apparatus according to claim 1, wherein the processor is configured to cause the second light emitting unit to emit light in a case where the setting is invalid and the second light emitting unit is used as autofocus auxiliary light.

4. The control apparatus of claim 1, wherein the processor is configured to cause the second light emitting unit to emit light in a case where the setting is invalid and the second light emitting unit is used as moving image light.

5. A flashlight apparatus comprising:
    the control apparatus according to claim 1;
    a third light emitting unit; and
    a fourth light emitting unit capable of emitting light for a longer time than the third light emitting unit.

6. The flashlight apparatus according to claim 5, wherein the processor is configured to cause:
    the fourth light emitting unit to emit light in a case where a setting for causing the third light emitting unit to emit light is valid, and
    the fourth light emitting unit not to emit the light in a case where the setting is invalid.

7. The flashlight apparatus according to claim 5, wherein the processor is configured to cause the fourth light emitting unit not to emit light in a case where a setting for causing the first light emitting unit to emit light is valid and a setting for causing the third light emitting unit to emit light is invalid.

8. An image pickup apparatus comprising:
    the control apparatus according to claim 1; and
    an image sensor.

9. A control method configured to control light emissions of a first light emitting unit and a second light emitting unit for each one or more flashlight apparatuses each of which includes the first light emitting unit and the second light emitting unit capable of emitting light for a longer time than the first light emitting unit, the control method comprising the steps of:
    acquiring information about a setting for causing the first light emitting unit to emit light;
    simultaneously controlling light emissions of the second light emitting units using the information;
    wirelessly communicating with the one or more flashlight apparatuses;

transmitting an instruction to a corresponding flashlight apparatus to cause the second light emitting unit to emit light in a case where the setting is valid; and transmitting an instruction to the corresponding flashlight apparatus to cause the second light emitting unit not to emit the light in a case where the setting is invalid.

10. A non-transitory computer-readable storage medium storing a program that causes a computer to execute the control method according to claim 9.

\* \* \* \* \*